US012606319B2

(12) United States Patent
Gambioli et al.

(10) Patent No.: US 12,606,319 B2
(45) Date of Patent: Apr. 21, 2026

(54) AIRCRAFT STRUCTURE DYNAMIC LOADING TESTING DEVICE

(71) Applicant: Airbus Operations Limited, Bristol (GB)

(72) Inventors: Francesco Gambioli, Bristol (GB); Verena Alice Lüebke, Taufkirchen (DE); Christina Jetzschmann, Taufkirchen (DE); Jens Levenhagen, Taufkirchen (DE); Hans Strauch, Taufkirchen (DE)

(73) Assignee: Airbus Operations Limited, Filton (GB)

( * ) Notice: Subject to any disclaimer, the term of this patent is extended or adjusted under 35 U.S.C. 154(b) by 1028 days.

(21) Appl. No.: 17/732,589

(22) Filed: Apr. 29, 2022

(65) Prior Publication Data

US 2022/0348358 A1 Nov. 3, 2022

(30) Foreign Application Priority Data

Apr. 29, 2021 (GB) ...................................... 2106163

(51) Int. Cl.
B64F 5/60 (2017.01)
(52) U.S. Cl.
CPC ...................................... B64F 5/60 (2017.01)
(58) Field of Classification Search
CPC ..... B64F 5/60; B64F 5/00; B64F 5/30; G01N 2203/00
USPC .......................................................... 73/802
See application file for complete search history.

(56) References Cited

U.S. PATENT DOCUMENTS

| | | | | | |
|---|---|---|---|---|---|
| 5,065,630 | A | * | 11/1991 | Hadcock | G01M 5/0016 73/802 |
| 6,032,545 | A | * | 3/2000 | Carpenter | G01L 5/133 73/865.9 |
| 2010/0150718 | A1 | * | 6/2010 | Freda | F03D 13/20 290/55 |

FOREIGN PATENT DOCUMENTS

| | | | | |
|---|---|---|---|---|
| CN | 107215480 | A | 9/2017 | |
| GB | 1317886 | A * | 5/1973 | B64F 5/60 |

OTHER PUBLICATIONS

British Search Report for Application No. 2106163 dated Jan. 26, 2022.
European Intention to Grant in EP Application No. 22169612.3 dated Sep. 23, 2025, 32 pages.

* cited by examiner

*Primary Examiner* — Marrit Eyassu
(74) *Attorney, Agent, or Firm* — KDW Firm PLLC

(57) ABSTRACT

An aircraft structure dynamic loading testing device, including a nozzle, an attachment mechanism with a first portion attached to the nozzle such that a nozzle force direction is constrained at a set orientation and a second portion for attaching to the aircraft structure and configured to be constrained at a given orientation with respect to the aircraft structure, and a length of conduit. In use, fluid is supplied along the length of conduit to the nozzle and ejected from the nozzle such that the nozzle exerts a dynamic force on the aircraft structure in the direction of the nozzle force direction. A dynamic loading testing device, a kit of parts and methods of dynamic load testing of a structure are disclosed.

18 Claims, 3 Drawing Sheets

AIRCRAFT STRUCTURE DYNAMIC LOADING TESTING DEVICE

CROSS-REFERENCE TO RELATED APPLICATION

This application claims priority to GB 2106163.5 filed Apr. 29, 2021, the entire disclosure of which is incorporated by reference herein.

TECHNICAL FIELD

The present disclosure relates to an aircraft structure dynamic loading testing device.

The disclosure herein concerns aircraft structure dynamic loading testing devices. More particularly, but not exclusively, this disclosure herein concerns a device capable of applying a dynamic force to an aircraft structure. The disclosure herein also concerns a dynamic loading testing device, a kit of parts and methods of dynamic load testing of a structure.

BACKGROUND

It is often desired to test the dynamic response of an aircraft structure. For example, it may be desired to be known how a wing structure would respond to a force being applied to it arising from movement of a control surface, such as an aileron.

This may be done using a hydraulic jack to exert a force to deflect the wing model (for example at an outboard region), and then release the force from the wing model. However, such a hydraulic jack arrangement is not capable of applying a (variable) force vector to a structure over a period of time.

An alternative way of testing a structure is to use a linear actuator attached to the structure at one end and fixed in position at the other end. In other words, the linear actuator is "grounded" by being fixed to the ground or another fixed object. The linear actuator can be controlled to change its length and thus provide a dynamic force to the structure being tested. However, the "grounding" effectively changes the stiffness of the aircraft structure and so affects the dynamic response that is being considered.

The disclosure herein seeks to mitigate the above-mentioned problems. Alternatively or additionally, the disclosure herein seeks to provide an improved aircraft structure dynamic loading testing device.

SUMMARY

The disclosure herein provides, according to a first aspect, an aircraft structure dynamic loading testing device, including a nozzle with a fluid inlet and a fluid outlet, and defining a nozzle force direction extending from the fluid outlet to the fluid inlet, an attachment mechanism for attaching the nozzle to the aircraft structure, the attachment mechanism comprising a first portion attached to the nozzle such that the nozzle force direction is constrained at a set orientation with respect to the first portion, and a second portion for attaching to the aircraft structure, wherein the second portion is configured to be constrained at a given orientation with respect to the aircraft structure, and a length of conduit for connecting at a first end to a fluid supply and connected at a second end to the nozzle inlet, wherein, in use, the nozzle force direction is constrained at a desired orientation with respect to the aircraft structure, and fluid is supplied along the length of conduit to the nozzle inlet and ejected from the nozzle outlet such that the nozzle exerts a dynamic force on the aircraft structure in the direction of the nozzle force direction.

Such a testing device is capable of applying a force vector to the aircraft structure and thus be able to monitor how the aircraft structure reacts (for example, its dynamic response) to such a force vector. The force vector may be applied over a period of time. The force vector may vary during the period of time. The testing device may be used to simulate the effect of movement of a control surface on an aircraft structure, for example the effect of movement of an aileron on an aircraft wing, by applying a force vector to the aircraft structure.

This is advantageous over a hydraulic jack arrangement. A hydraulic jack is generally used to exert a force to deflect an aircraft structure, and then release the force from the structure. Such a hydraulic jack arrangement is not capable of applying a (variable) force vector to a structure over a period of time.

The testing device is also advantageous over a linear actuator arrangement. A linear actuator would generally be attached to the structure at one end and the other end is fixed in position (i.e. "grounded" by being fixed to the ground or another fixed object). This "grounding", however, effectively changes the stiffness of the aircraft structure and so affects the dynamic response that is being considered. Instead, the testing device enables a truer test of the dynamic response of a structure.

The nozzle force direction is the direction running from an exit plane of the nozzle (where the fluid is ejected from the nozzle) to an entrance plane of the nozzle (where the fluid from the fluid supply is received by the nozzle). A nozzle flow direction is the direction running from an entrance plane of the nozzle (where the fluid from the fluid supply is received by the nozzle) to an exit plane of the nozzle (where the fluid is ejected from the nozzle). This corresponds to a mean flow along the nozzle. The nozzle force direction is along the same line or axis as the nozzle flow direction but is in the opposite direction to the nozzle flow direction. For a symmetrical nozzle (i.e. a nozzle when viewed end-on, i.e. from the entrance or exit of the nozzle, that is rotationally symmetrical), the nozzle flow and force directions are generally along the axis of rotational symmetry.

Having a set orientation of the nozzle force direction with respect to the first portion allows the nozzle force direction to remain unchanged (with respect to the first portion and also with respect to the aircraft structure) during testing. For example, significant fluid flow through the nozzle does not cause the (nozzle flow direction or) nozzle force direction to significantly change orientation. This enables the orientation of the nozzle force direction to be known and predictable throughout testing, thus the direction of the force vector being exerted on the aircraft structure to be in a desired direction. However, the set orientation may be able to be changed and configured to a new orientation between tests. This enables a different force vector direction to be applied by the same testing device.

Having a given orientation of the second portion with respect to the aircraft structure allows the orientation of the second portion (and also orientation of the nozzle force direction) to remain unchanged with respect to the aircraft structure during testing. For example, significant fluid flow through the nozzle does not cause the (nozzle flow direction or) nozzle force direction to significantly change orientation. This enables the orientation of the nozzle force direction to be known and predictable throughout testing, thus the direction of the force vector being exerted on the aircraft structure to be in a desired direction. However, the given orientation may be able to be changed and configured to a new orientation between tests. This enables a different force vector direction to be applied by the same testing device.

The nozzle force direction is constrained at a desired orientation with respect to the aircraft structure as result of (i) the nozzle force direction being constrained at a set orientation with respect to the first portion of the attachment mechanism, (ii) the first portion being rigidly connected to the second portion and (iii) the second portion being constrained at a given orientation with respect to the aircraft structure. In other words, the desired orientation is a combination of the set and given orientations.

Hence, the nozzle force direction orientation is able to remain unchanged with respect to the aircraft structure during testing. For example, significant fluid flow through the nozzle does not cause the (nozzle flow direction or) nozzle force direction to significantly change orientation. This enables the orientation of the nozzle force direction to be known and predictable throughout testing, thus the direction of the force vector being exerted on the aircraft structure to be in a desired direction. However, the desired orientation may be able to be changed (by changing the set and/or given orientations) and configured to a new orientation between tests. This enables a different force vector direction to be applied by the same testing device.

The nozzle is configured to exert a dynamic force on the aircraft structure via the first and second portions of the attachment mechanism.

The fluid flow rate supplied along the length of the conduit may be varied to control the magnitude of the force vector, applied to the aircraft structure, during testing. The fluid flow rate supplied to the nozzle inlet may be varied to control the magnitude of the force vector, applied to the aircraft structure, during testing. The fluid flow rate ejected from the nozzle outlet may be varied to control the magnitude of the force vector, applied to the aircraft structure, during testing.

The first portion and second portion of the attachment mechanism may be rigidly connected. The first portion and the second portion of the attachment mechanism may be integral.

The testing device may further comprise a control mechanism configured to control the fluid flow rate ejected from the nozzle outlet, supplied to the nozzle inlet and/or supplied along the length of conduit. The control mechanism may be located on the conduit. The control mechanism may be configured to vary an effective diameter of the conduit (for example, using a valve).

The set and/or given orientations may be constrained in a first plane, preferably also a second orthogonal plane, more preferably also a third orthogonal plane. For example, this may enable the nozzle force direction to be constrained in any or all of the planes parallel to a length of the aircraft structure, a width of the aircraft structure and/or a height of the aircraft structure.

The aircraft structure may be a structural part of an aircraft, for example an aircraft wing. The aircraft structure may be a test specimen. The test specimen may be a model of a structural part of an aircraft. The test specimen may be a scale model of a structural part of an aircraft.

Preferably, the aircraft structure dynamic loading testing device further includes a second nozzle with a fluid inlet and a fluid outlet, and defining a second nozzle force direction extending from the fluid outlet to the fluid inlet of the second nozzle, such that each of the first and second nozzles is capable of applying a dynamic force on the aircraft structure in the direction of its respective nozzle force direction.

This enables a resulting force to be varied quickly by changing the relative fluid flow rates of the nozzles. For example, the resultant force may be changed from zero to a certain magnitude by changing the fluid flow rates of the nozzles from a non-zero fluid flow rate. For example, at the start of a test, the nozzles may each have a certain (non-zero) fluid flow rate that may cancel each other to provide zero resultant force. The relative fluid flow rates can then be changed to provide a required resultant force. This is especially helpful for a nozzle arrangement where the two nozzles force directions are in opposite directions.

The testing device may comprise more than two (similar) nozzles, for example 3 or 4 nozzles.

Each nozzle is capable of exerting a nozzle force on the structure in the direction of its nozzle force direction. These nozzle forces act on the aircraft structure such that a resultant force is exerted on the aircraft structure. The direction and magnitude of the resultant force vector is dependent on the fluid flow rate of the fluid through each nozzle and the orientation (with respect to the aircraft structure) of the nozzle force directions.

Having a second (or more) nozzle enables the direction of the resultant force exerted on the aircraft structure to be changed by changing the flow through one or more nozzles. This could be done in the middle of a test, without having to change a set or given orientation of a nozzle.

The second (or third, or fourth etc.) nozzle force direction may be in the same plane as the first nozzle force direction.

The second (or third, or fourth etc.) nozzle may be attached to the first portion of the attachment mechanism such that the second (or third, or fourth etc.) nozzle force direction is constrained at a second (or third, or fourth etc.) set orientation with respect to the first portion of the attachment mechanism. The second (or third, or fourth etc.) set orientation and first set orientation may be fixed in relation to each other.

For example, the second set orientation (i.e. two nozzles) may be at 180 degrees to the first set orientation. For example, the first, second and third set orientations (i.e. three nozzles) may be at 120 degrees to each other. For example, the first, second, third and fourth set orientations (i.e. four nozzles) may be at 90 degrees to each other.

For example, the second nozzle force direction may be at 180 degrees to the first nozzle force direction. For example, the first, second and third nozzle force directions (i.e. three nozzles) may be at 120 degrees to each other. For example, the first, second, third and fourth nozzle directions (i.e. four nozzles) may be at 90 degrees to each other.

Alternatively, the testing device may further include a second (or third, or fourth etc.) (similar) attachment mechanism for attaching the second (or third, or fourth etc.) nozzle to the aircraft structure, wherein the second (or third, or fourth etc.) nozzle force direction is constrained at a second (or third, or fourth etc.) set orientation with respect to a first portion of the second (or third, or fourth etc.) attachment mechanism.

For example, the second nozzle force direction may be at 180 degrees to the first nozzle force direction. For example, the first, second and third nozzle force directions (i.e. three nozzles) may be at 120 degrees to each other. For example, the first, second, third and fourth nozzle directions (i.e. four nozzles) may be at 90 degrees to each other.

In use, fluid may be supplied along the length of conduit to the inlets of first and second (or third, or fourth etc.)

nozzles. Here, control of the resultant force exerted on the aircraft structure may be achieved by controlling the relative fluid flow rate to the first and second (or third, or fourth etc.) nozzles. For example, the testing device may comprise a manifold with an inlet connected to the second end of the length of conduit and a number of outlets, each connected to one of the nozzle inlets, wherein the fluid flow rate through at least one, and preferably all, manifold outlets can be controlled.

Alternatively, in use, fluid may be supplied separately along lengths of first and second (or third, or fourth etc.) conduits to the inlets of first and second (or third, or fourth etc.) nozzles, respectively. Here, control of the resultant force exerted on the aircraft structure may be achieved by controlling the relative fluid flow rate through the first and second (or third, or fourth etc.) lengths of conduit.

Preferably, the second nozzle force direction is in the opposite direction to the first nozzle force direction.

As noted above, this enables the resultant force along the line of those two directions to be controlled effectively by controlling the relative fluid flow rates of the two nozzles.

Preferably, the first nozzle force direction and second nozzle force direction are offset from each other by an offset distance.

This enables the testing device to apply a turning moment to the aircraft structure.

The first nozzle force direction and second nozzle force direction may be offset from each other in a direction perpendicular to the nozzle force directions.

For example, they may be offset in a direction parallel to a length of the aircraft structure, and/or a width of the aircraft structure. The first nozzle force direction may be offset from the second nozzle force direction along both the length and the width of the aircraft structure.

Preferably, the length of conduit comprises a flexible portion.

This enables the fluid supply to be de-coupled from the aircraft structure, such that fluid can be supplied from the fluid supply to the nozzle on the aircraft structure, without constraining movement of the aircraft structure.

Preferably, the length of conduit comprises a rigid portion.

This enables the length of conduit to be used as part (for example, the second portion) of the attachment mechanism to attach the nozzle to the aircraft structure. For example, the rigid portion may be configured to be constrained at a given orientation with respect to (for example, fixed to) the aircraft structure.

Preferably, the attachment mechanism comprises a rigid elongate rod, configured to be attached to the aircraft structure in at least two locations along a length of the elongate rod.

This enables the orientation of the rigid rod (and therefore also the nozzle directions) to be constrained with respect to the aircraft structure. The rigid elongate rod may comprise a rigid pipe, as part of the length of conduit.

Preferably, the second portion of the attachment mechanism comprises a number of pin joints for attaching to the aircraft structure.

Such pin joints add minimal effective stiffness to the aircraft structure for testing.

Preferably, the second portion of the attachment mechanism comprises a number of slidable connections for attaching to the aircraft structure.

This enables the aircraft structure to slide relative to the testing device and so adds minimal effective stiffness to the aircraft structure for testing.

The second portion of the attachment mechanism may be configured to attach to the aircraft structure using, for example, adhesive, clips or ties.

Preferably, the aircraft structure dynamic loading testing device further includes a fluid flow rate controller.

The fluid flow rate controller may be located upstream of the first end of the length of conduit, within the length of conduit, or adjacent the one or more nozzle inlets. It may comprise a controllable valve.

Preferably, the aircraft structure dynamic loading testing device further includes a fluid supply connected to the first end of the length of conduit.

The fluid supply may comprise a pressurized fluid vessel containing a fluid. The fluid may be liquid. The fluid may be water.

More preferably, the fluid supply comprises a first fluid vessel connected to the first end of the length of conduit and a second fluid vessel connected to the first fluid vessel, such that, in use, the second fluid vessel provides a pressurized fluid to the first fluid vessel, so as to pressurize the first fluid vessel.

The first fluid vessel may contain a liquid. The first fluid vessel may contain water.

The second fluid vessel may contain a gas. The second fluid vessel may contain air. The second fluid vessel may be connected to a compressor. The compressor may be used to pressurize the fluid in the second fluid vessel.

The pressurized fluid (gas) in the second fluid vessel may pressurize the fluid (liquid) in the first fluid vessel. This enables control of the fluid flow through the nozzle(s) and thus the magnitude of the force vector exerted on the aircraft structure to be controlled by controlling the pressurized fluid (gas) provided by the second fluid vessel. For example, there may be a pressure regulator located between the second fluid vessel and the first fluid vessel.

There may be a flow regulator downstream of the first fluid vessel, for example located within the length of conduit.

Preferably, the aircraft structure dynamic loading testing device further comprises a collection device, for collecting fluid ejected from the nozzle.

The collection device may comprise a collection vessel. The collection device may comprise a casing for enclosing the nozzle(s). This allows the fluid to be collected effectively. The casing may comprise a gap for allowing length of conduit(s) to pass through the casing to the enclosed nozzle(s).

According to a second aspect of the disclosure herein there is also provided a dynamic loading testing device, for dynamic load testing of an aircraft structure, the device including a nozzle with a fluid inlet and a fluid outlet, and defining a nozzle force direction extending from the fluid outlet to the fluid inlet, an attachment mechanism for attaching the nozzle to the aircraft structure, the attachment mechanism comprising a first portion attached to the nozzle such that the nozzle force direction is constrained at a set orientation with respect to the first portion, and a second portion for attaching to the aircraft structure, wherein the second portion is rigidly connected to the first portion and configured to be constrained at a given orientation with respect to the aircraft structure, and a length of conduit for connecting at a first end to a fluid supply and connected at a second end to the nozzle inlet, wherein, in use, the nozzle force direction is constrained at a desired orientation with respect to the aircraft structure, and fluid is supplied along the length of conduit to the nozzle inlet and ejected from the nozzle outlet such that the nozzle exerts a dynamic force on the aircraft structure, in the direction of the nozzle force direction.

According to a third aspect of the disclosure herein there is also provided a kit of parts for forming a dynamic loading testing device, for dynamic load testing of an aircraft structure, including a nozzle with a fluid inlet and a fluid outlet, and defining a nozzle force direction extending from the fluid outlet to the fluid inlet, an attachment mechanism for attaching the nozzle to the aircraft structure, the attachment mechanism comprising a first portion for attaching to the nozzle such that the nozzle force direction is constrained at a set orientation with respect to the first portion, and a second portion for attaching to the aircraft structure, wherein the second portion is configured to be rigidly connected to the first portion and configured to be constrained at a given orientation with respect to the aircraft structure, and a length of conduit for connecting at a first end to a fluid supply and for connecting at a second end to the nozzle inlet.

The kit of parts may be a kit of parts for forming an aircraft structure dynamic loading testing device.

The kit of parts may further comprise a fluid supply for connecting to the first end of the length of conduit. The fluid supply may be as described above.

The kit of parts may further comprise any other feature or combination of features as described above.

According to a fourth aspect of the disclosure herein there is also provided a method of dynamic load testing of a structure, the method including using the device or kit of parts as described above.

According to a fifth aspect of the disclosure herein there is also provided a method of dynamic load testing of a structure, the method including the following steps attaching a nozzle to the structure, such that a nozzle direction of the nozzle is constrained in orientation with respect to the structure, supplying a fluid to the nozzle such that the nozzle exerts a dynamic force on the structure, in an opposite direction to the nozzle direction, and measuring the response of the structure to the dynamic force exerted.

According to a sixth aspect of the disclosure herein there is also provided a method of dynamic load testing of a structure, the method including the following steps attaching a nozzle to the structure, such that a nozzle direction of the nozzle is constrained in orientation with respect to the structure, ejecting a fluid from the nozzle such that the nozzle exerts a dynamic force on the structure, in an opposite direction to the nozzle direction, and measuring the response of the structure to the dynamic force exerted.

The method may be a method of dynamic load testing of an aircraft structure. The aircraft structure may be an aircraft wing.

The fluid supplied to the nozzle may be controlled to provide a desired dynamic force.

According to a seventh aspect of the disclosure herein there is also provided a dynamic loading testing device, for dynamic load testing of an aircraft structure, the device including a nozzle having an outlet for ejecting fluid in a first direction along a nozzle axis, an attachment mechanism for attaching the nozzle to the aircraft structure so that the nozzle axis is constrained to a set orientation with respect of the aircraft structure, and a length of conduit for supplying fluid to the nozzle, wherein, in use, when fluid is supplied along the length of conduit to the nozzle and ejected from the nozzle outlet in the first direction, the nozzle exerts a dynamic force on the aircraft structure in a second direction along the nozzle axis, the second direction being opposite to the first direction.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
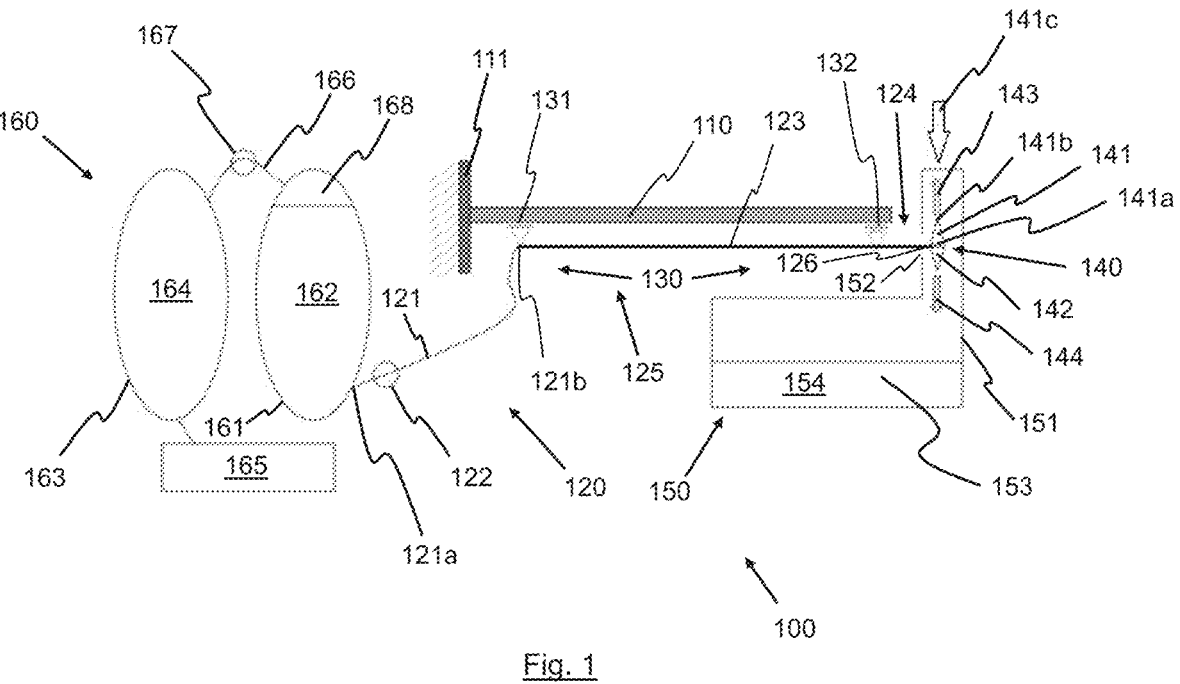
FIG. 1 shows a schematic side view of a test set-up according to a first embodiment of the disclosure herein.

FIG. 1 shows a schematic side view of a test set-up 100 according to a first embodiment of the disclosure herein.

The test set-up 100 is to test a dynamic response of a specimen small scale wing model 110. The wing model 110 has a span of 3 meters and is attached in a cantilevered fashion to a wall 111.

Test equipment is attached to and/or used with the wing model 110, as follows:

Water supply equipment, generally indicated as 160, includes a water vessel 161 containing water 162. The water vessel 161 is connected to a gas vessel 163 via a pipe 166 including a pressure regulator 167. The gas vessel 163 contains air 164 that is pressurized using a compressor 165 connected to the gas vessel 163.

In use, the compressor 165 pressurizes the air 164 in the gas vessel 163. This air is provided through pipe 166 and pressure regulator 167 at a desired pressure to the water vessel 161 (see air 168 at top of water vessel 161). This enables water at a desired pressure to be urged out of the water vessel 161 and hence, supply water.

For example, the gas vessel 163 may have a volume of 100 liters, with the air pressurized to 20 MPa. The water vessel 161 may have a volume of 100 liters, with the water pressurized to 1 MPa.

The water is supplied from the supply equipment 160 to water delivery equipment, generally indicated as 120. This equipment includes a flexible hose 121 connected to the water vessel 161 at its first end 121a to receive the supplied water. The flexible hose 121 includes a flow regulator 122. A second end 121b of the flexible hose is connected to a rigid pipe 123. Hence, water flows from the water vessel 161 through the flexible hose 121 and then through the rigid pipe 123. The flexible hose 121 acts to decouple any movement of the rigid pipe 123 from the supply equipment 160, such that movement of the rigid pipe 123 is not affected or limited by the connection to the supply equipment.

The rigid pipe 123 is attached to the wing model 110 on its underside by a support system, generally indicated as 130, including two pin supports 131 and 132. Inboard support 131 is a simple pin joint that attaches a first end of the rigid pipe to the wing model 110. Outboard support 132 (nearer to a second opposite end 126 of the rigid pipe 123) is a pin joint but is also a slidable joint to allow the rigid pipe 123 to slide relative to the wing model 110 at that location. This combination of pin joint and a slidable joint enables the rigid pipe 123 to be attached to the wing model 110 such that its orientation is fixed in relation to the wing model 110, but so it does not impart a significant stiffness to the wing model 110 (i.e. allows the wing model 110 to flex as it would normally).

The rigid pipe 123 can be thought of in two notional sections; a support section 125 that includes the locations of the two supports 131, 132 and a nozzle section 124. The nozzle section 124 extends past the end of the wing model 110 and is attached to a nozzle assembly 140 at the second end 126 of the rigid pipe 123. Water is supplied through the rigid pipe 123 to its second end 126 and to the nozzle assembly 140.

The nozzle assembly 140 includes an upward facing nozzle 141 and a downward facing nozzle 142. This enables water to be ejected upwards (arrow 143) and downwards (arrow 144). The amount of water (mass flow rate) through each nozzle 141, 142 can be controlled to provide a resultant force (up or down) on the wing model 110. This control is provided by two valves (one for each nozzle) and the control assembly described later in relation to FIG. 2.

Each nozzle has an inlet (for the upward facing nozzle labelled as 141*a*) and an outlet (for the upward facing nozzle labelled as 141*b*). The outlets have a diameter of 0.031 m. Each nozzle exerts force on the wing model 110 in a nozzle force direction, which is in the opposite direction to the water flow direction (for the upward facing nozzle the water flow direction is labelled as 143 and the nozzle force direction is labelled as 141*c*).

Here, the nozzles 141, 142 are located at the same position (i.e. in line with each other relative to the nozzle force directions) in relation to the wing model 110 and are thus able to apply a desired force at that location.

The test equipment also comprises a water tank 150 for collecting water ejected from the nozzles 141, 142. The tank 150 comprises a casing 151 that surrounds the nozzles 141, 142, such that the second end 126 of the rigid pipe 123 extends into the casing 151 through gap 152. The tank 150 also comprises a lower section 153 for collecting used water 154.

In use, the equipment is capable of applying a force of 650N for a period of 5 seconds.

Figure 2:
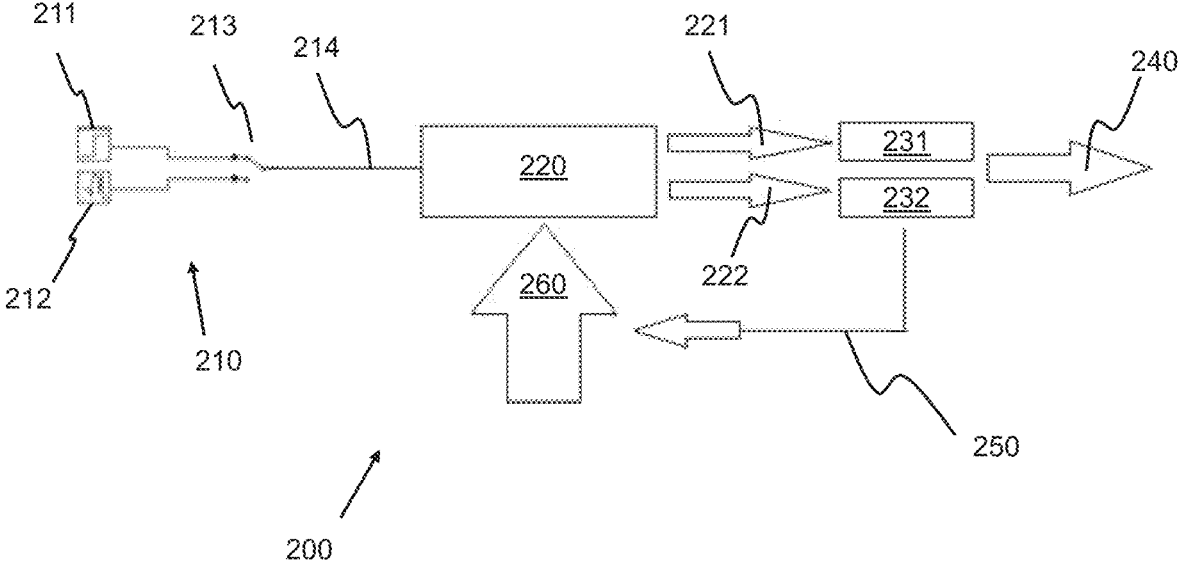
FIG. 2 shows a schematic diagram showing a control assembly for the test set-up of FIG. 1.

FIG. 2 shows a schematic diagram showing a control assembly 200 for the test set-up 100 of FIG. 1.

The assembly 200 comprises a selection module, generally indicated as 210, including a user switch 213 to move between a first (step change) force profile 211 and a second (variable) force profile 212. Whichever profile is chosen is fed to a control calculator 220 by the selection line 214.

The control calculator 220 calculates the mass flow rate required to provide the required force at a given point in time (according to the profile/setting chosen). This is done using the equation:

$$\text{force} = \text{density of fluid} \times (\text{speed of fluid})^2 \times \text{area of nozzle outlet}$$

Where there are two nozzles (as here), the resultant (desired) force is the differential between the forces (i.e. mass flow and/or speed of fluid) at the two nozzles. These signals are sent to the different nozzles, in the form of a valve opening control signal. Arrow 221 indicates the signal sent to an actuator 231 that controls the amount of opening of a valve at the inlet of the upwards facing nozzle 141. Arrow 222 indicates the signal sent to an actuator 232 that controls the amount of opening of a valve at the inlet of the downwards facing nozzle 142.

Hence, this provides the required resultant force on the wing model 110, indicated by arrow 240.

In addition, the actual mass flow rates (or speed of fluid) of the nozzles 141, 142 are measured and fed back (through feedback loop 250) to the control calculator 220 so that the control calculator 220 can adjust the amount of valve opening according to the mass flow rate achieved. The control calculator 220 is also fed with the water pressure and gas pressure from the vessels 162, 163—indicated by arrow 260.

Hence, the control assembly 200 is able to control the force applied to the wing model 110 over time and thus produce a variety of force profiles/magnitudes to be tested. The force profile could be to simulate the effect of movement of an aileron on the wing model 110.

Figure 3:
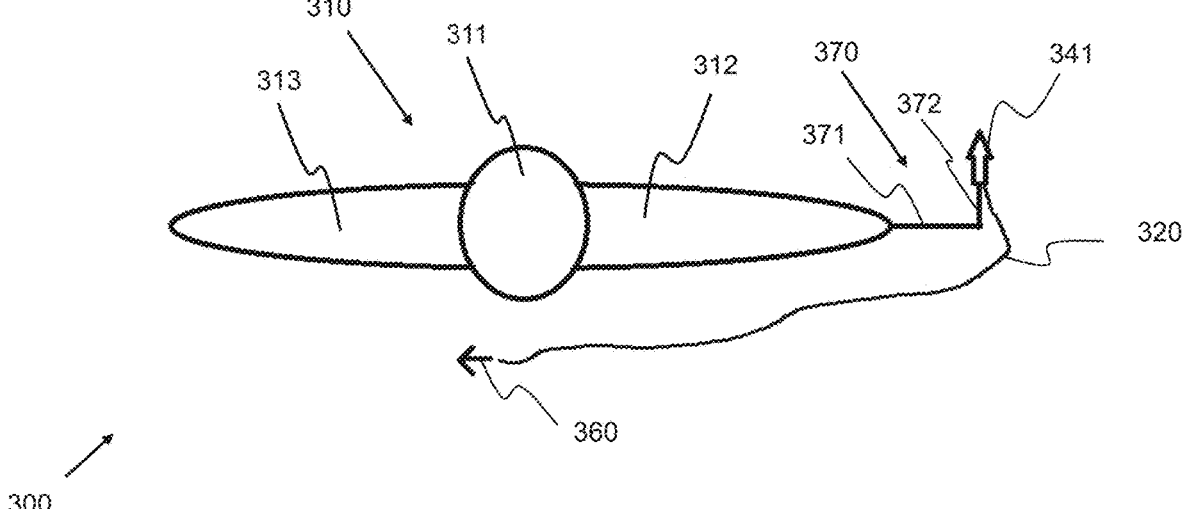
FIG. 3 shows a schematic side view of a test set-up according to a second embodiment of the disclosure herein.

FIG. 3 shows a schematic side view of a test set-up 300 according to a second embodiment of the disclosure herein.

The structure to be tested is a wing 312 of an aircraft 310 (the aircraft also including a fuselage 311 and a second wing 313).

Here, a single nozzle, indicated by water flow arrow 341, is attached to the outboard end of the wing 312 by a rigid bracket 370 comprising a first part 371 attached to the wing 312 and a second part 372 (at a right angle to point upwards). The nozzle 341 is attached to the second part so it points upwards. The nozzle 341 is supplied with water from a flexible hose 320 connected to a water supply, indicated by arrow 360.

In use, the water supply 360 can be turned on and off (or otherwise controlled to give a required mass flow rate through the nozzle 341) and thus exert a desired force magnitude/profile on the wing 312. This force profile could be to simulate the effect of movement of an aileron on the wing 312.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

In the above examples, the nozzle or nozzles have a fixed orientation, which does not change with respect to the structure being tested (either during testing or otherwise). However, it is possible to have an arrangement where one or more of the nozzles (or the nozzle assembly collectively) can be adjusted between orientation settings into one of a variety of set orientations, depending on the nozzle force direction(s) required for the upcoming test.

In the above examples, the nozzles are aligned with each other such that the nozzle force directions are aligned. However, the nozzles may be located in an offset manner such that they are offset in a direction perpendicular to the plane of the nozzle force directions. They may be offset in a direction along the length of the structure being tested (e.g., wing span) or across the width of the structure being tested (e.g., wing chord), for example. This enables a moment to be applied to the structure.

There may be any suitable number of nozzles, for example 3 or 4 nozzles. The direction of the nozzle force directions may be distributed evenly, for example 120 degrees apart for 3 nozzles and 90 degrees apart for 4 nozzles.

Any suitable fluid (either liquid or gas) may be used to provide the mass flow rate to achieve the required force exerted on the structure. For example, air may be used as the fluid supplied. A gas may be used where the force required is relatively small. Where gas is used, no collection tank is required.

Any suitable arrangement of pressure regulation and flow regulation may be used. For example, there may be further redundancy in the system.

The mass flow rate (or fluid speed) may be controlled adjacent the nozzles (in the nozzle assembly) or further upstream of the nozzles, for example along the rigid pipe, flexible pipe, or as part of the supply equipment.

Any suitable force profile and/or magnitude may be used.

Any suitable attachment mechanism to attach the nozzle(s) to the structure may be used.

The test equipment may be used to test many different kinds of structure or models of structures.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

It should be noted that throughout this specification, "or" should be interpreted as "and/or".

Although the disclosure herein has been described above mainly in the context of a fixed-wing aircraft application, it may also be advantageously applied to various other applications, including but not limited to applications on vehicles such as helicopters, drones, trains, automobiles and spacecraft.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structure dynamic loading testing device comprising:

a nozzle with a fluid inlet and a fluid outlet, and defining a nozzle force direction extending from the fluid outlet to the fluid inlet;

an attachment mechanism for attaching the nozzle to the aircraft structure, the attachment mechanism comprising:

a first portion attached to the nozzle such that the nozzle force direction is constrained at a set orientation with respect to the first portion; and a second portion for attaching to the aircraft structure, wherein the second portion is configured to be constrained at a given orientation with respect to the aircraft structure;

a fluid flow rate controller; and a length of conduit for connecting at a first end to a fluid supply and connected at a second end to the nozzle inlet;

wherein, in use, the nozzle force direction is constrained at a desired orientation with respect to the aircraft structure, and fluid is supplied along the length of conduit to the nozzle inlet and ejected from the nozzle outlet such that the nozzle exerts a dynamic force on the aircraft structure in a direction of the nozzle force direction.

2. The aircraft structure dynamic loading testing device according to claim 1, comprising a second nozzle with a fluid inlet and a fluid outlet, and defining a second nozzle force direction extending from the fluid outlet to the fluid inlet of the second nozzle, such that each of the first and second nozzles is configured to apply a dynamic force on the aircraft structure in a direction of its respective nozzle force direction.

3. The aircraft structure dynamic loading testing device according to claim 2, wherein the second nozzle force direction is in an opposite direction to the first nozzle force direction.

4. The aircraft structure dynamic loading testing device according to claim 2, wherein the first nozzle force direction and second nozzle force direction are offset from each other by an offset distance.

5. The aircraft structure dynamic loading testing device according to claim 1, wherein the length of conduit comprises a flexible portion.

6. The aircraft structure dynamic loading testing device according to claim 1, wherein the length of conduit comprises a rigid portion.

7. The aircraft structure dynamic loading testing device according to claim 1, wherein the attachment mechanism comprises a rigid elongate rod, configured to be attached to the aircraft structure in at least two locations along a length of the elongate rod.

8. The aircraft structure dynamic loading testing device according to claim 1, wherein the second portion of the attachment mechanism comprises a number of pin joints for attaching to the aircraft structure.

9. The aircraft structure dynamic loading testing device according to claim 1, wherein the second portion of the attachment mechanism comprises a number of slidable connections for attaching to the aircraft structure.

10. The aircraft structure dynamic loading testing device according to claim 1, further comprising a fluid supply connected to the first end of the length of conduit.

11. The aircraft structure dynamic loading testing device according to claim 10, wherein the fluid supply comprises a first fluid vessel connected to the first end of the length of conduit and a second fluid vessel connected to the first fluid vessel, such that, in use, the second fluid vessel provides a pressurized fluid to the first fluid vessel, to pressurize the first fluid vessel.

12. The aircraft structure dynamic loading testing device according to claim 1, comprising a collection device, for collecting fluid ejected from the nozzle.

13. A method of dynamic load testing of a structure, the method comprising using the device of claim 1.

14. A method of using the aircraft structure dynamic loading testing device according to claim 1 for dynamic load testing of the aircraft structure comprising:

attaching the nozzle to the aircraft structure, such that a nozzle direction of the nozzle is constrained in orientation with respect to the aircraft structure;

supplying a fluid to the nozzle such that the nozzle exerts a dynamic force on the aircraft structure, in an opposite direction to the nozzle direction; and measuring a response of the aircraft structure to the dynamic force exerted.

15. A method of using the aircraft structure dynamic loading testing device according to claim 1 for dynamic load testing of the aircraft structure comprising:

attaching the nozzle to the aircraft structure, such that a nozzle direction of the nozzle is constrained in orientation with respect to the aircraft structure;

ejecting a fluid from the nozzle such that the nozzle exerts a dynamic force on the aircraft structure, in an opposite direction to the nozzle direction; and measuring a response of the aircraft structure to the dynamic force exerted.

16. A dynamic loading testing device, for dynamic load testing of an aircraft structure, the device comprising:

a nozzle with a fluid inlet and a fluid outlet, and defining a nozzle force direction extending from the fluid outlet to the fluid inlet;

an attachment mechanism for attaching the nozzle to the aircraft structure, the attachment mechanism comprising:

a first portion attached to the nozzle such that the nozzle force direction is constrained at a set orientation with respect to the first portion; and a second portion for attaching to the aircraft structure, wherein the second portion is rigidly connected to the first portion and configured to be constrained at a given orientation with respect to the aircraft structure;

a fluid flow rate controller; and a length of conduit for connecting at a first end to a fluid supply and connected at a second end to the nozzle inlet;

wherein, in use, the nozzle force direction is constrained at a desired orientation with respect to the aircraft structure, and fluid is supplied along the length of conduit to the nozzle inlet and ejected from the nozzle outlet such that the nozzle exerts a dynamic force on the aircraft structure, in a direction of the nozzle force direction.

17. A kit of parts for forming a dynamic loading testing device, for dynamic load testing of an aircraft structure, comprising:

a nozzle with a fluid inlet and a fluid outlet, and defining a nozzle force direction extending from the fluid outlet to the fluid inlet;

an attachment mechanism for attaching the nozzle to the aircraft structure, the attachment mechanism comprising:

a first portion for attaching to the nozzle such that the nozzle force direction is constrained at a set orientation with respect to the first portion; and a second portion for attaching to the aircraft structure, wherein the second portion is configured to be rigidly connected to the first portion and configured to be constrained at a given orientation with respect to the aircraft structure;

a fluid flow rate controller; and a length of conduit for connecting at a first end to a fluid supply and for connecting at a second end to the nozzle inlet;

wherein, in use, the nozzle force direction is constrained at a desired orientation with respect to the aircraft structure, and fluid is supplied along the length of conduit to the nozzle inlet and ejected from the nozzle outlet such that the nozzle exerts a dynamic force on the aircraft structure in a direction of the nozzle force direction.

18. A dynamic loading testing device, for dynamic load testing of an aircraft structure, the device comprising:

a nozzle having an outlet for ejecting fluid in a first direction along a nozzle axis;

an attachment mechanism for attaching the nozzle to the aircraft structure so that the nozzle axis is constrained to a set orientation with respect to the aircraft structure;

a fluid flow rate controller; and a length of conduit for supplying fluid to the nozzle;

wherein, in use, when fluid is supplied along the length of conduit to the nozzle and ejected from the nozzle outlet in the first direction, the nozzle exerts a dynamic force on the aircraft structure in a second direction along the nozzle axis, the second direction being opposite to the first direction.

* * * * *